United States Patent [19]

Dominguez, Jr. et al.

[11] Patent Number: 5,347,596

[45] Date of Patent: Sep. 13, 1994

[54] PATTERN MOVER FOR RASTER PRINTING

[75] Inventors: Ruben Dominguez, Jr., El Paso, Tex.; Stephen D. Hanna, Boulder, Colo.

[73] Assignee: IBM Corporation, Armonk, N.Y.

[21] Appl. No.: 65,701

[22] Filed: May 21, 1993

Related U.S. Application Data

[63] Continuation of Ser. No. 219,686, Jul. 15, 1988, abandoned.

[51] Int. Cl.$^5$ .................................................. G06K 9/36
[52] U.S. Cl. ...................................... 382/46; 358/451; 358/452; 364/514; 382/47; 345/126
[58] Field of Search ......................... 382/46, 47, 44; 358/451, 452; 101/93.04; 400/121; 340/727, 731; 364/523, 715.04, 715.07

[56] References Cited

U.S. PATENT DOCUMENTS

| | | | |
|---|---|---|---|
| 3,289,164 | 11/1966 | Rabinow | 382/47 |
| 4,271,476 | 6/1981 | Lotspiech | 382/46 |
| 4,545,069 | 10/1985 | Kermisch | 382/46 |
| 4,553,171 | 11/1985 | Holladay et al. | 358/263 |
| 4,593,407 | 6/1986 | Konishi et al. | 382/46 |
| 4,627,097 | 12/1986 | Finlay et al. | 382/46 |
| 4,635,212 | 1/1987 | Hatazawa | 382/44 |
| 4,741,635 | 5/1988 | Shibata et al. | 400/121 |
| 4,747,154 | 5/1988 | Suzuki et al. | 382/47 |
| 4,881,069 | 11/1989 | Kameda et al. | 382/47 |
| 4,907,284 | 3/1990 | Ohuchi | 382/47 |

FOREIGN PATENT DOCUMENTS 0260883  3/1988  European Pat. Off. .

OTHER PUBLICATIONS

IBM Technical Disclosure Bulletin, vol. 27, No. 10B, Mar. 1985 entitled "Efficient Transformation of an N by N Array of Picture Elements".

IBM Technical Disclosure Bulletin article entitled "Print Rotation Technique" by D. C. Green and W. B. Kauczka, vol. 24, No. 11B, Apr. 1982, pp. 5953–5954.

IBM Technical Disclosure Bulletin article entitled "Page Image Printing" by K. Kitamura and Y. Takao, vol. 27, No. 10A, Mar. 1985, pp. 5788–5789.

*Primary Examiner*—Joseph Mancuso
*Attorney, Agent, or Firm*—Carl M. Wright

[57] ABSTRACT

Clipping individual rows or columns of pels from patterns stored as pels is accomplished by passing quads of pels through a clipper before rotation is effected. Integral numbers of quads are clipped by skipping their address when reading from the pattern store or inhibiting their transfer. This permits more detailed pages to be composed for printing.

5 Claims, 5 Drawing Sheets

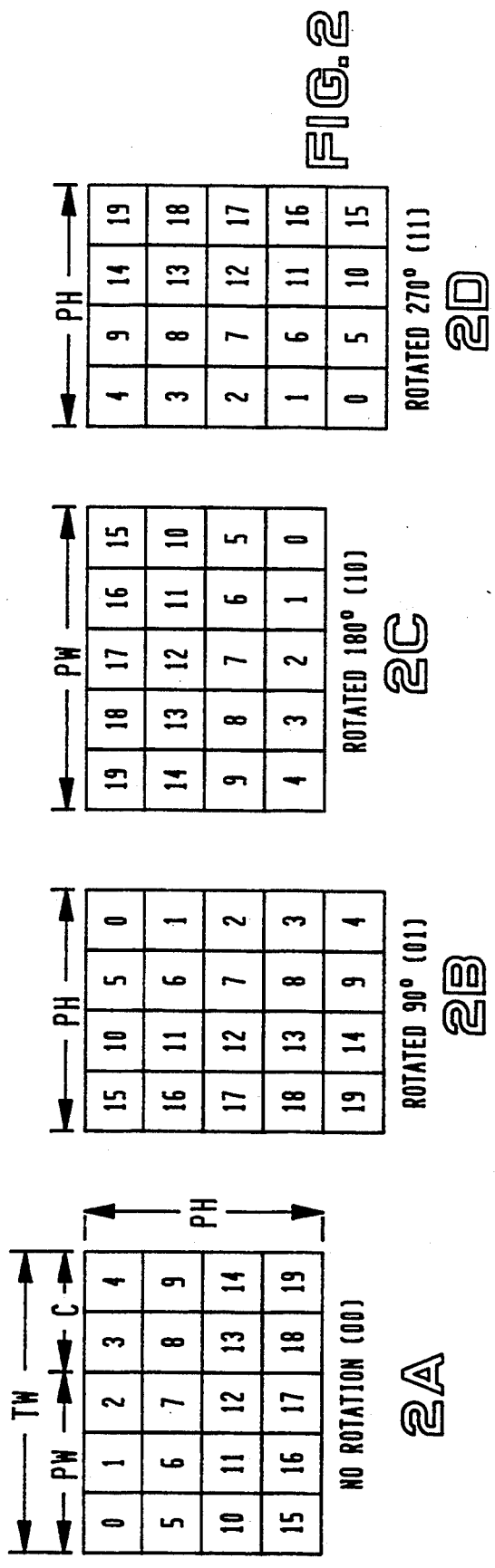

| | CONTROL SIGNALS | | | PATTERN STORE DATA BITS | | | | | | | | | | | | | | | |
|---|---|---|---|---|---|---|---|---|---|---|---|---|---|---|---|---|---|---|---|---|
| L I N | P W 1 1 | P W 1 2 | P W 1 3 | P W 1 4 | P H 1 3 | P H 1 4 | B R O W | R C O L | G S 0 0 | G S 0 1 | G S 0 2 | G S 0 3 | G S 0 4 | G S 0 5 | G S 0 6 | G S 0 7 | G S 0 8 | G S 0 9 | G S 1 0 | G S 1 1 | G S 1 2 | G S 1 3 | G S 1 4 | G S 1 5 |
| 0 | - | - | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | - | - | 1 | 1 | 1 | 0 | 1 | 1 | 1 | 1 | 1 | 1 | 1 | 1 | 1 | 1 | 1 | 1 | 1 | 0 | 0 | 0 | 0 | 0 |
| 0 | - | - | 1 | 1 | 0 | 1 | 1 | 1 | 1 | 1 | 1 | 1 | 1 | 1 | 1 | 0 | 0 | 0 | 0 | 0 | 0 | 0 | 0 | 0 |
| 0 | - | - | 1 | 1 | 0 | 0 | 1 | 1 | 1 | 1 | 1 | 0 | 0 | 0 | 0 | 0 | 0 | 0 | 0 | 0 | 0 | 0 | 0 | 0 |
| 0 | - | - | 1 | 0 | 1 | 1 | 1 | 1 | 1 | 1 | 1 | 0 | 1 | 1 | 1 | 0 | 1 | 1 | 1 | 0 | 1 | 1 | 1 | 0 |
| 0 | - | - | 1 | 0 | 1 | 0 | 1 | 1 | 1 | 1 | 1 | 0 | 1 | 1 | 1 | 0 | 1 | 1 | 1 | 0 | 0 | 0 | 0 | 0 |
| 0 | - | - | 1 | 0 | 0 | 1 | 1 | 1 | 1 | 1 | 1 | 0 | 1 | 1 | 1 | 0 | 0 | 0 | 0 | 0 | 0 | 0 | 0 | 0 |
| 0 | - | - | 1 | 0 | 0 | 0 | 1 | 1 | 1 | 1 | 1 | 0 | 0 | 0 | 0 | 0 | 0 | 0 | 0 | 0 | 0 | 0 | 0 | 0 |
| 0 | - | - | 0 | 1 | 1 | 1 | 1 | 1 | 1 | 1 | 0 | 0 | 1 | 1 | 0 | 0 | 1 | 1 | 0 | 0 | 1 | 1 | 0 | 0 |
| 0 | - | - | 0 | 1 | 1 | 0 | 1 | 1 | 1 | 1 | 0 | 0 | 1 | 1 | 0 | 0 | 1 | 1 | 0 | 0 | 0 | 0 | 0 | 0 |
| 0 | - | - | 0 | 1 | 0 | 1 | 1 | 1 | 1 | 1 | 0 | 0 | 1 | 1 | 0 | 0 | 0 | 0 | 0 | 0 | 0 | 0 | 0 | 0 |
| 0 | - | - | 0 | 1 | 0 | 0 | 1 | 1 | 1 | 1 | 0 | 0 | 0 | 0 | 0 | 0 | 0 | 0 | 0 | 0 | 0 | 0 | 0 | 0 |
| 0 | - | - | 0 | 0 | 1 | 1 | 1 | 1 | 1 | 0 | 0 | 0 | 1 | 0 | 0 | 0 | 1 | 0 | 0 | 0 | 1 | 0 | 0 | 0 |
| 0 | - | - | 0 | 0 | 1 | 0 | 1 | 1 | 1 | 0 | 0 | 0 | 1 | 0 | 0 | 0 | 1 | 0 | 0 | 0 | 0 | 0 | 0 | 0 |
| 0 | - | - | 0 | 0 | 0 | 1 | 1 | 1 | 1 | 0 | 0 | 0 | 1 | 0 | 0 | 0 | 0 | 0 | 0 | 0 | 0 | 0 | 0 | 0 |
| 0 | - | - | 0 | 0 | 0 | 0 | 1 | 1 | 1 | 0 | 0 | 0 | 0 | 0 | 0 | 0 | 0 | 0 | 0 | 0 | 0 | 0 | 0 | 0 |
| 1 | 1 | 1 | 1 | 1 | - | - | - | 1 | 1 | 1 | 1 | 1 | 1 | 1 | 1 | 1 | 1 | 1 | 1 | 1 | 1 | 1 | 1 | 1 |
| 1 | 1 | 1 | 1 | 0 | - | - | - | 1 | 1 | 1 | 1 | 1 | 1 | 1 | 1 | 1 | 1 | 1 | 1 | 1 | 1 | 1 | 1 | 0 |
| 1 | 1 | 1 | 0 | 1 | - | - | - | 1 | 1 | 1 | 1 | 1 | 1 | 1 | 1 | 1 | 1 | 1 | 1 | 1 | 1 | 1 | 0 | 0 |
| 1 | 1 | 1 | 0 | 0 | - | - | - | 1 | 1 | 1 | 1 | 1 | 1 | 1 | 1 | 1 | 1 | 1 | 1 | 1 | 1 | 0 | 0 | 0 |
| 1 | 1 | 0 | 1 | 1 | - | - | - | 1 | 1 | 1 | 1 | 1 | 1 | 1 | 1 | 1 | 1 | 1 | 1 | 1 | 0 | 0 | 0 | 0 |
| 1 | 1 | 0 | 1 | 0 | - | - | - | 1 | 1 | 1 | 1 | 1 | 1 | 1 | 1 | 1 | 1 | 1 | 1 | 0 | 0 | 0 | 0 | 0 |
| 1 | 1 | 0 | 0 | 1 | - | - | - | 1 | 1 | 1 | 1 | 1 | 1 | 1 | 1 | 1 | 1 | 1 | 0 | 0 | 0 | 0 | 0 | 0 |
| 1 | 1 | 0 | 0 | 0 | - | - | - | 1 | 1 | 1 | 1 | 1 | 1 | 1 | 1 | 1 | 1 | 0 | 0 | 0 | 0 | 0 | 0 | 0 |
| 1 | 0 | 1 | 1 | 1 | - | - | - | 1 | 1 | 1 | 1 | 1 | 1 | 1 | 1 | 1 | 0 | 0 | 0 | 0 | 0 | 0 | 0 | 0 |
| 1 | 0 | 1 | 1 | 0 | - | - | - | 1 | 1 | 1 | 1 | 1 | 1 | 1 | 1 | 0 | 0 | 0 | 0 | 0 | 0 | 0 | 0 | 0 |
| 1 | 0 | 1 | 0 | 1 | - | - | - | 1 | 1 | 1 | 1 | 1 | 1 | 1 | 0 | 0 | 0 | 0 | 0 | 0 | 0 | 0 | 0 | 0 |
| 1 | 0 | 1 | 0 | 0 | - | - | - | 1 | 1 | 1 | 1 | 1 | 1 | 0 | 0 | 0 | 0 | 0 | 0 | 0 | 0 | 0 | 0 | 0 |
| 1 | 0 | 0 | 1 | 1 | - | - | - | 1 | 1 | 1 | 1 | 1 | 0 | 0 | 0 | 0 | 0 | 0 | 0 | 0 | 0 | 0 | 0 | 0 |
| 1 | 0 | 0 | 1 | 0 | - | - | - | 1 | 1 | 1 | 1 | 0 | 0 | 0 | 0 | 0 | 0 | 0 | 0 | 0 | 0 | 0 | 0 | 0 |
| 1 | 0 | 0 | 0 | 1 | - | - | - | 1 | 1 | 1 | 0 | 0 | 0 | 0 | 0 | 0 | 0 | 0 | 0 | 0 | 0 | 0 | 0 | 0 |
| 1 | 0 | 0 | 0 | 0 | - | - | - | 1 | 1 | 0 | 0 | 0 | 0 | 0 | 0 | 0 | 0 | 0 | 0 | 0 | 0 | 0 | 0 | 0 |
| - | - | - | - | - | - | - | 0 | 0 | 1 | 1 | 1 | 1 | 1 | 1 | 1 | 1 | 1 | 1 | 1 | 1 | 1 | 1 | 1 | 1 |
| 0 | - | - | - | - | 1 | 1 | 1 | 0 | 1 | 1 | 1 | 1 | 1 | 1 | 1 | 1 | 1 | 1 | 1 | 1 | 1 | 1 | 1 | 1 |
| 0 | - | - | - | - | 1 | 0 | 1 | 0 | 1 | 1 | 1 | 1 | 1 | 1 | 1 | 1 | 1 | 1 | 1 | 0 | 0 | 0 | 0 | 0 |
| 0 | - | - | - | - | 0 | 1 | 1 | 0 | 1 | 1 | 1 | 1 | 1 | 1 | 1 | 0 | 0 | 0 | 0 | 0 | 0 | 0 | 0 | 0 |
| 0 | - | - | - | - | 0 | 0 | 1 | 0 | 1 | 1 | 1 | 0 | 0 | 0 | 0 | 0 | 0 | 0 | 0 | 0 | 0 | 0 | 0 | 0 |
| 0 | - | - | 1 | 1 | - | - | 0 | 1 | 1 | 1 | 1 | 1 | 1 | 1 | 1 | 1 | 1 | 1 | 1 | 1 | 1 | 1 | 1 | 1 |
| 0 | - | - | 1 | 0 | - | - | 0 | 1 | 1 | 1 | 1 | 0 | 1 | 1 | 1 | 0 | 1 | 1 | 1 | 0 | 1 | 1 | 1 | 0 |
| 0 | - | - | 0 | 1 | - | - | 0 | 1 | 1 | 1 | 0 | 0 | 1 | 1 | 0 | 0 | 1 | 1 | 0 | 0 | 1 | 1 | 0 | 0 |
| 0 | - | - | 0 | 0 | - | - | 0 | 1 | 1 | 0 | 0 | 0 | 1 | 0 | 0 | 0 | 1 | 0 | 0 | 0 | 1 | 0 | 0 | 0 |
| 1 | - | - | - | - | - | - | - | 0 | 1 | 1 | 1 | 1 | 1 | 1 | 1 | 1 | 1 | 1 | 1 | 1 | 1 | 1 | 1 | 1 |

FIG. 7

PATTERN MOVER FOR RASTER PRINTING

This is a continuation of copending application Ser. No. 07/219,686 filed Jul. 15, 1988, and now abandoned.

BACKGROUND OF THE INVENTION

1. Field of the Invention

This invention relates to apparatus for forming images to be printed on raster or all-points-addressable printers. It relates particularly to building up the image to be printed from prestored patterns which are stored as pels and more particularly to eliminating or clipping the patterns on a pel basis so that patterns can be overlaid with more precision.

2. Description of Related Art

The pages printed on All Point Addressable (APA) printers are usually stored as raster images, the images being being mapped dot by dot from the raster storage, also referred to as a raster buffer, via the printer to the printing medium. In the simplest case, the pels (dots or picture elements) are black or white, stored in the raster buffer as binary values.

Even at a low resolution such as 240 pels per inch, a standard letter sized page requires a memory capable of storing about 5.4 million bits. The technique most commonly used has been to store in a page memory characters or code words that are keyed to (represent) patterns stored in a pattern store. Typical patterns are letters, punctuation, and the like. Custom characters can be included such as trademarks and business logos, and fonts can be changed or intermixed. According to the commands in the page buffer, patterns are moved from the pattern store to the raster buffer. The raster buffer may contain the pel images for an entire page or a few hundred lines of pels ahead of the pels being printed. Therefore, the page is composed in the page buffer in terms of prestored patterns which are moved to the raster buffer in accordance with the commands from the page buffer.

This approach permits text and graphics to be combined on the same page while permitting pages to be printed at high speeds.

Whether text or graphics, the images can be stored as more than one pattern in the pattern store and composed in the raster buffer by positioning the patterns in adjacent character boxes, i.e., preallocated positions for characters.

Usually, however, it is desirable to be able to vary the space occupied by a pattern by eliminating, trimming, or clipping parts of the pattern.

SUMMARY OF THE INVENTION

In accordance with the invention, a system for moving prestored patterns of images to be printed includes a pattern storage for storing pels making up the individual patterns to be used to construct a raster image to be printed. By the use of a first address means, selected patterns are moved as quads of pels from the pattern storage to an image store by a transfer means which clips and rotates the quads according to the orientation in which the patterns are to be printed. A second address means supplies the addresses in the image store at which the moved patterns are to be stored.

In the prior art, moving groups of pels to an image store or raster buffer in the correct orientation for printing did not allow for adjusting the size of the pattern being moved except in increments of the quad, or subblock size. This limited the flexibility and arrangement of overlapping patterns.

This invention permits the patterns to be moved as quads and also for rows or columns of pels to be clipped from the edge quads. Only the edge quads need be clipped because the clipping of whole quads can be accomplished fastest by skipping over, i.e., not addressing, quads to be clipped.

BRIEF DESCRIPTION OF THE DRAWING

The invention is described in detail by referring to the various figures which illustrate specific embodiments of the invention, and wherein like numerals refer to like elements.

FIGS. 2A–2D are representations of patterns showing the mapping of quads for various rotated orientations.

FIGS. 3A–3D are representations of quads of pels showing the order of mapping in the cumulating means for various rotated orientations.

FIG. 3E is a representation of the bit arrangement in a linear quad.

FIG. 7 is a logical truth table for the generation of the clip control signals.

DESCRIPTION OF THE PREFERRED EMBODIMENT

The following terms are used in the detailed explanation of the preferred embodiment of the invention. Pel means picture element and is the smallest unit of an image; sometimes referred as a dot. Pel also means the resolution of an image into dots or elements, e.g., 240 pels (per inch) indicates that each square inch is composed of 240×240, or 57,600 pels. The usual practice is that a pel value of 1 represents a black pel and a pel value of 0 represents a white pel. Pixel is sometimes used in the art as synonymous with pel.

Image means the representation of a page as stored pels to be printed, where the pel values may be binary in case of black and white printing or multibit in case of gray scale printing.

Pattern means a rectangular array of pels which represent the graphic of some object, e.g., a character of a font or a pictorial illustration, several patterns usually being used to make up an image.

Quad means a 4×4 square subarray of a pattern having 16 pels.

Pattern Store (PS) means a memory for storing patterns.

Raster Buffer (RB) means a memory for storing the image while it is being composed and sometimes including the memory from which the page is printed; it can be accessed by quads or sixteen bit linear words.

Total Width (TW) means the width in quads (less one) of a pattern in the pattern store, i.e., a pattern to be moved.

Pattern Width (PW) means the width in quads (less one) of the pattern to moved to the raster buffer; the difference TW−PW is the number of quads to be clipped. Clipping of individual pels is performed by multiplexing.

Pattern Height (PH) means the height in quads (less one) of the pattern to be moved to the raster buffer.

Clipping means the removal of quads by skipping addresses or eliminating pels from the right-hand column or bottom row of a pattern by forcing the clipped pel values to zero.

The IGS (image generator system) creates images by moving patterns from the pattern store to the raster buffer. This can be done with hardware which moves 16 bits of data at a time, each 16-bit word representing one quad of data. Each quad is logically ORed into the raster buffer and therefore overlays the data already in place.

Figure 1:
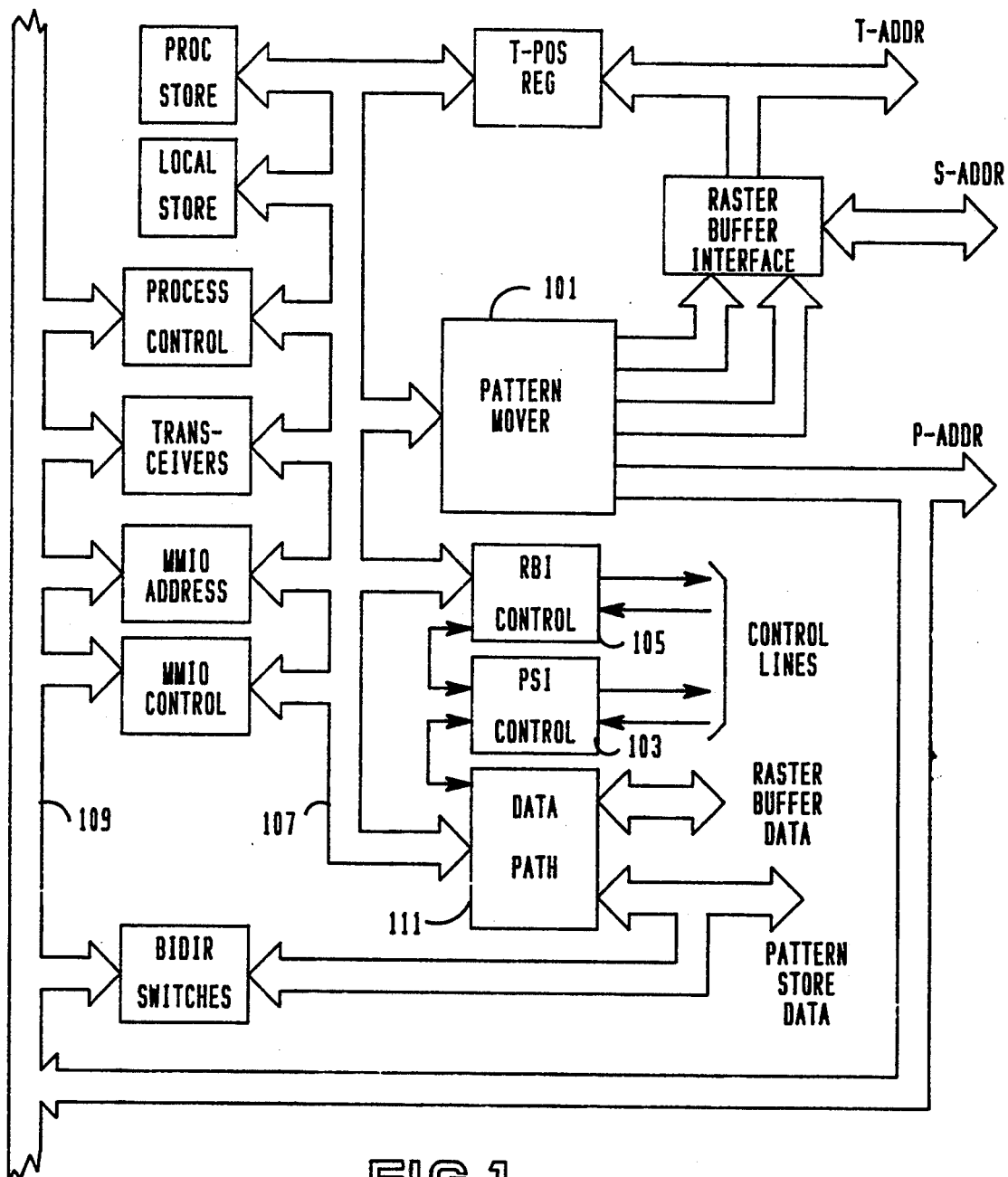
FIG. 1 is a block diagram of a system in which the invention is useful.

The block diagram of the IGS in FIG. 1 represents a printer control system in which prestored patterns are selected and moved under the control of a pattern mover 101. The pattern mover 101 is coupled to a control processor via a processor bus 107. A second bus 109, MMIO/DMA (Main Memory Input-Output/-Direct Memory Access), is shown as connectable to the processor bus 107 but its function is not needed for an explanation of the present invention.

The pattern mover 101 supplies three output sets of address signals, viz., the T-address, the S-address, and the P-address. The P-address is the address of a pattern prestored in the pattern store (not shown). Selected prestored patterns are moved from the pattern store to a raster buffer, also called an image buffer or cumulating means.

The page to be printed as a raster of pels or dots is built up in the raster buffer referred to as a cumulating means. The locations at which the selected prestored patterns are positioned in the cumulating means are controlled by the S- and T-addresses, the S-address specifying the column and the T-address, the row. These addresses are supplied through a pipeline arrangement described in more detail below.

Control signals for the RBI (Raster Buffer Interface) and the PSI (Pattern Store Interface) are supplied by an RBI control 105 and a PSI control 103, respectively. The control signals institute read, write, memory select, and memory acknowledge operations.

The data comprising the patterns to be moved are directed by a data path controller 111. The RBDATA (raster buffer data) is routed to the cumulating means via a pipeline structure.

Pattern data can be directed to the pattern store to permit downloading of patterns of predetermined images including fonts and the like.

The prestored patterns being moved into the cumulating means can be rotated and clipped by the transferring means which includes the pattern mover 101 and the data path controller 111.

The patterns are moved by quads of pels, e.g., 16 pels at a time. Other size quads are possible and within the scope of the invention. The number 16 is preferable when using processors that transfer and operate on data words 16 bits wide.

FIGS. 2A–2D illustrates the arrangement of quads in a prestored pattern. FIG. 12A represents a 20-quad prestored pattern. The quads are four bits wide and four bits high. The pattern is five quads wide, TW being the total width, and four quads high, PH being the pattern height. The entire pattern may not always be used so clipping is employed to reduce the total width (TW) to the desired pattern width (PW). In the illustrative case shown in FIG. 2A, the two rightmost columns of quads are clipped, i.e., not transferred to the cumulating means.

During transfer of the pattern, it may be rotated. A pair of bits in the command stream can be used to designate the orientation of the transferred pattern. As an example, 00 may indicate no rotation; 01, 90-degree rotation (for sideways printing); 10, 180-degree rotation; and 11, 270-degree rotation.

FIG. 2B illustrates the location of all twenty quads, i.e., no clipping, as they would be oriented in the cumulating means after transfer if rotated 90-degree. FIGS. 2C and 2D illustrate the quad orientation in the cumulating means for 180-degree and 270-degree rotations, respectively.

The dimensions PH and PW do not change with rotation. Their position relative to the orientation of the quads remains invariant.

FIGS. 3A through 3E show the bit arrangements within individual quads. FIGS. 3A through 3D relate to rectangular quads and FIG. 3E relates to linear quads. Bit 15 is the most significant bit of a 16-bit word and bit 0, the least significant bit.

The individual bits in the quads must be rearranged to effect rotation in a manner similar to the rearrangement of the quads. FIGS. 3A through 3D show 0-degree, 90-degree, 180-degree, and 270-degree rotation, respectively.

To effect rotation, the quads are retrieved in sequential order from the pattern store. FIG. 2A shows the sequence (0 to 19) in which the quads are addressed and retrieved from the pattern store. The quad bits are retrieved in parallel as 16-bit words. Quad 0 is addressed initially, the address being determined by the commands from the page buffer. The addresses of the other quads numbers are offsets from the initial address.

Columns of quads can be clipped by skipping the addresses of the columns to be clipped. For example, to clip the quads as shown in FIG..2A, the address sequence for the quads is 0-1-2-5-6-7-10-11-12-15-16-17.

The S- and T-addresses at which the quads are stored in the cumulating means are varied according to the indicated orientation. The S- and T-addresses are initially set to the location in the cumulating means where the zero quad of the pattern is to be stored.

Figure 4:
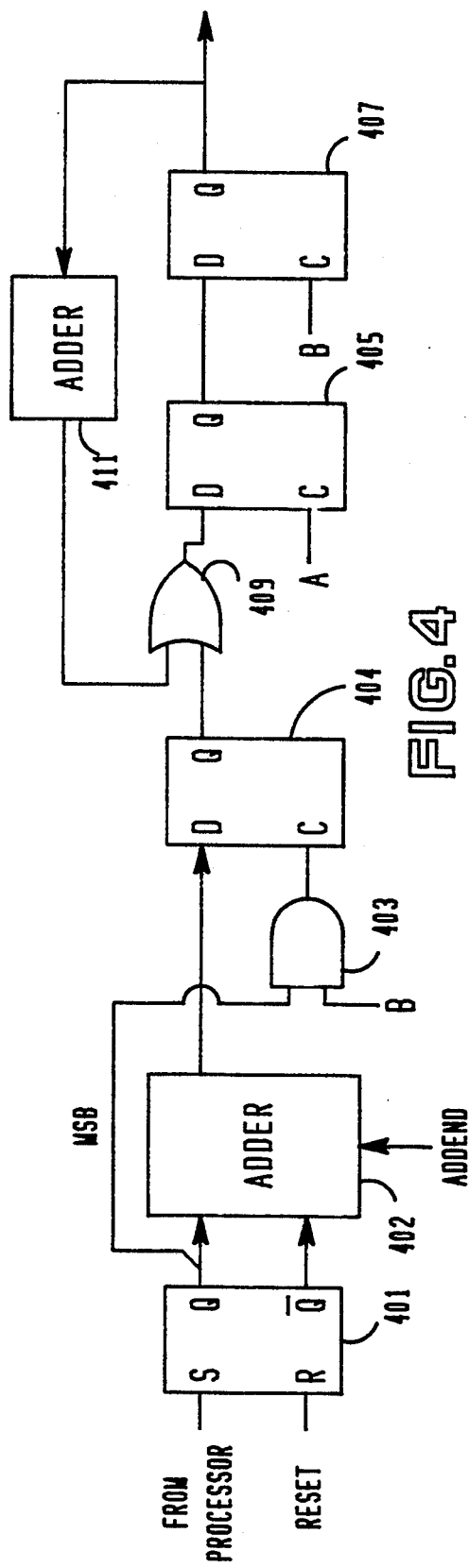
FIG. 4 is a block diagram of a generation logic circuit for P-, S-, and T-addresses.

FIG. 4 shows a hardware implementation for generating the S- and T-addresses. There is one such circuit for the S-address and another for the T-address. As noted above, the S-address designates the column in the cumulating means and the T-address, the row at which the quads are stored.

The setting of the first register 401 (representing several clocked D flip-flops in parallel) in the pipeline of FIG. 4 can be accomplished a synchronously. The register stages are initially reset and then set as necessary from the processor bus. An extra address bit, MSB, as an example, is used to signify the first stage register 401 is loaded.

A two-phase clock, A and B, is used throughout the system. As the first stage registers 401 are loaded, the output signals are applied to one set of input terminals of an adder 402. The other input signals (addend) to the adder 402 are the values of PW or PH or four times or sixteen times the values of PW or PH. The four-multiple can be obtained by shifting the PW or PH value two bit positions toward the most significant end of the register. The sixteen-multiple requires four bit position shifts.

The shifting can be done by a multiplexer in a manner that is well known in the art and need not be explained in detail.

The output signals from the adder 402 are the S- and T-addresses which are clocked into the second stage registers 404 by the output signal from an AND gate network 403 activated by the MSB of the address decode data and a B-phase clock signal.

At the next A-phase clock signal, the contents of second stage register 404 is set into the third stage registers 405. The next B-phase clock signal sets the contents of the third stage registers 405 into the fourth stage registers 407 which supply the S- and T-addresses to the cumulating means. The number of stages is used to synchronize the addresses with the data from the pattern store.

Successive addresses are generated by an adder 411 coupling the output signals from the fourth stage registers 407 to the input terminals of the third stage registers 405 via an OR gate 409.

The following table summarizes the operation of the adders 402 and 411 to store the quads in the correct orientation in the cumulating means.

command pipeline 501 supply signals to a clip control circuit 503 and a rotate control circuit 507.

The signals to the clip control 503 include PW11-14, PH13-14, BROW, RCOL, and LIN. Signals to the rotate control 507 include LIN, ROT00, ROT01, ROT10, and ROT11, the latter being the commands for 0-, 90-, 180-, and 270-degree rotations, respectively. The clip logic 505 and rotate logic 509 are in the pattern store data pipeline which contains registers clocked by the two-phase clock signals so that the timing is compatible with the addresses. Synchronizing the addresses and data to move from the pattern store to the cumulating means (raster buffer) is within the skill of the art and need not be described in detail for an understanding of the invention.

Figure 6B:
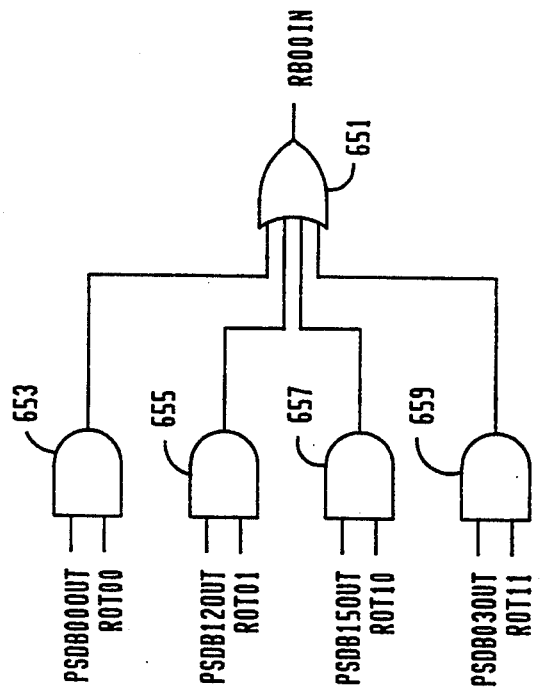
FIG. 6B is logic circuit diagram of one bit of a multiplexer used in the rotate logic of FIG. 5.

The rotate logic 509 can implemented as a multiplexer, one stage of which is shown in FIG. 6B. The signal RB00IN from an OR gate 651 is the input signal of the most significant bit to the raster buffer (cumulating means), possibly through intermediate timing registers. The input signals to the multiplexer stage shown in FIG. 6B are pattern store data bits, PSDB00OUT, PSDB030UT, PSDB12OUT, and PSDB150UT, from

| LIN | ROT | SA INIT | TA INIT | INNER LOOP | OUTER LOOP |
|-----|-----|---------|---------|------------|------------|
| 0 | 00 | S | T | SA = SA + 4 | TA = TA + 4 |
| 0 | 01 | S + 4PH | T | TA = TA + 4 | SA = SA − 4 |
| 0 | 10 | S + 4PW | T + 4PH | SA = SA − 4 | TA = TA − 4 |
| 0 | 11 | S | T + 4PW | TA = TA − 4 | SA = SA + 4 |
| 1 | 00 | S | T | SA = SA + 16 | TA = TA + 1 |
| 1 | 01 | S + 16PH | T | TA = TA + 1 | SA = SA − 16 |
| 1 | 10 | S + 16PW | T + PH | SA = SA − 16 | TA = TA − 1 |
| 1 | 11 | S | T + PW | TA = TA − 1 | SA = SA + 16 |

LIN indicates whether the 16 bits of data are to be treated as a rectangular quad (0) or a linear half word (1). The ROT signals are the rotation signals described above. The values of S and T are loaded into the first stage registers 401 from the processor bus. The SA INIT and the TA INIT values are those shifted from the adder 402 into the second stage registers 404.

The address generator for the pattern store is similar to that shown in FIG. 4 for the S- and T-addresses, the only difference being that no adder 402 is required and the adder 411 need only increment the address by one. The clipping of pels from the left columns or the bottom rows is performed by either skipping the addresses for those quads when generating the addresses or by inhibiting the data from the pattern store through the data path pipeline. The latter is presumed to be the case for the embodiment being described. Images are cumulated in the buffer storage by ORing input data with data already in the cumulating means. This permits overlay of images. If no data is passed to the cumulating means during a particular quad time, then the data already in the addressed positions remain unchanged. The contents of the cumulating means are set to zero as the data is read out to the printer.

Figure 5:
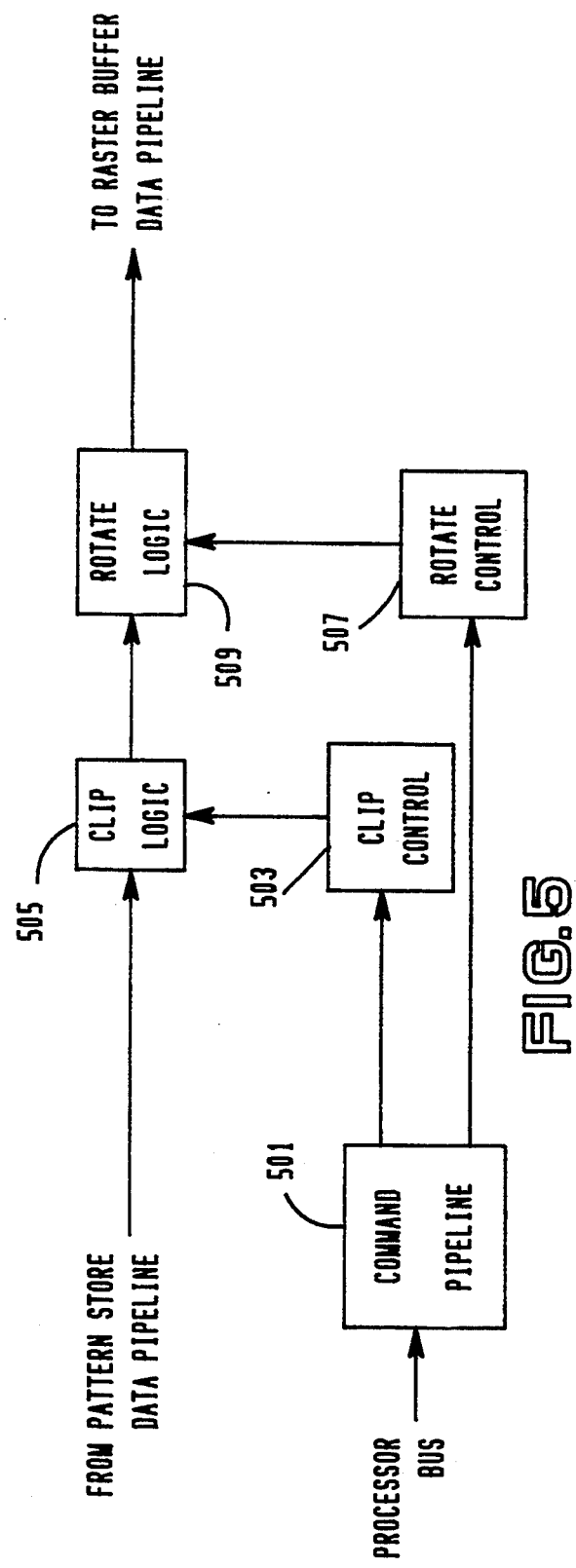
FIG. 5 is a block diagram of a pipeline for clipping and rotating pattern store data.

A portion of the data pipeline from the pattern store to the cumulating means is shown in FIG. 5. The clipping of individual columns or rows of bits is accomplished as well as the rotation of the bits within each quad. The manipulation of the S- and T-addresses rotates the quads but the bits within each quad must also be rotated for the pattern to be correctly oriented.

A stream of commands are pipelined from the page store via the processor bus in a command pipeline 501. The timing means and the command decoders in the the clip logic 505 of FIG. 5. FIGS. 3A-3D show that the upper left cell, i.e., bit position 00 in the cumulating means, contains these bits for various rotated orientations. For no rotation, the PSDB00OUT is gated by the ROT00 signal at an AND gate 653 and thence to the OR gate 651. Similarly, the PSDB12OUT is gated by the signal ROT01 at an AND gate 655 to effect a 90-degree rotation. The 180- and 270-degree rotations are effected by gating the PSDB150UT with the signal ROT10 at an AND gate 657 and by gating the PSDB030UT with the signal ROT11 at an AND gate 659, respectively. The other bits, i.e., RB01IN-RB15IN, are multiplexed similarly in a manner that can be determined from FIGS. 3A-3D.

Figure 6A:
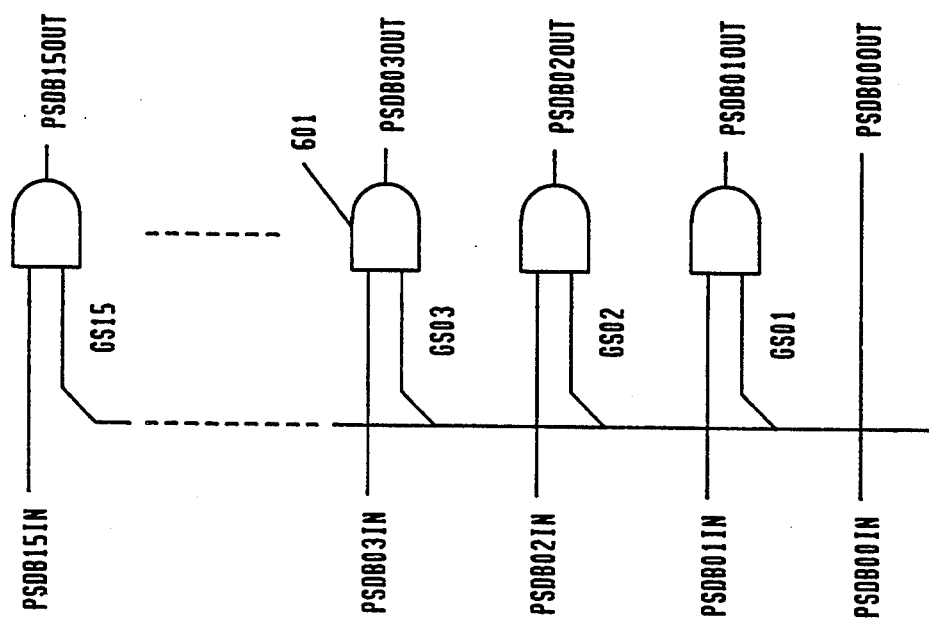
FIG. 6A is a logic circuit diagram of the clip logic of FIG. 5.

The clip logic details are shown in FIG. 6A. The signals PSDB00IN-PSDB15IN are supplied from the pattern store and applied to AND gates with the exception of PSDB00IN. Each signal PSDB01IN-PSDB15IN is gated by a gating signal GS01-GS15, respectively, supplied by the clip control 503 of FIG. 5. As described above, the bits (or pels) are ORed into the cumulating means. Therefore, by forcing a bit to zero, i.e., not gating in the clip logic, the bit is effectively clipped.

The gating signals GS01-GS15 are determined from the truth table of FIG. 7. The first nine columns are the input signals to the clip control and the last 15 columns are the gating signals supplied to the AND gates of FIG. 6A. The table of FIG. 7 shows that the PSDB00 is always passed (shown as a logic value of 1 in the table). The other gating signals depend on the control signals. The gating signal to an AND gate 601 in FIG. 6A will be used as an illustrative example.

The AND gate 601 in FIG. 6A is controlled by the GS03 signal to pass or to clip the PSDB03IN. From the table of FIG. 7, it is found by Boolean algebra reduction techniques that $$GS03 = LIN \& (PW11 \text{ v } PW12) \text{ v } RCOL' \text{ v } PW13 \& PW14$$

The & symbol is the Boolean AND operation, v is Boolean OR, and ' is Boolean NOT (inversion or complementation). Thus, the GS03 signal is a logical 1 whenever the quad is linear and either PW11 or PW12 is active, or whenever RCOL is not active, or whenever both PW13 and PW14 are active at the same time. Therefore, given the table of FIG. 7, all the gating signals GS01-GS15 can be determined by a person skilled in the art.

The arrangement shown and described in detail can clip entire quads by skipping the associated addresses in the pattern store memory or inhibiting the data path and can also clip individual columns or rows of bits (pels) using the technique described. This permits a page to be composed in more detail than was possible in the prior art where patterns could be clipped only by integral numbers of quads.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A system for selectively moving prestored image patterns or segments thereof to construct an image, said image being composed in an image storage means for displaying/printing as pels comprising:
    pattern storage means for storing individual patterns in the forms of pels;
    first addressing means for retrieving from said pattern storage means quads of pels comprising a selected a pattern;
    transfer means for moving said quads of pels to said image storage means, said transfer means including,
        means for selectively removing a single row or column of original image pels from an edge of a quad being moved, and
    means for rotating said quads of pels; and
    second addressing means for supplying addresses in the image storage means at which said quads from said transferring means are stored to compose the image to be printed.

2. The system as claimed in claim 1 wherein said means for selectively removing a single row or column of original image pels comprises:
    means for generating control signals; and
    gating means controlled by said control signals for selectively gating signals representing said pels to be stored in the image storage means.

3. The system claimed in claim 1 wherein said means for rotating said quads of pels includes means for multiplexing signals representing said pels to be rotated.

4. In a system for displaying images in the form of dots, including means for prestoring patterns as rectangular groups of dots, means for cumulating an image to be displayed, and means for transferring selected prestored patterns into said cumulating means, the improvement comprising:
    clipping means included in said transferring means for selectively removing single rows or single columns of dots of original image information from certain patterns or rectangular groups of dots being transferred; and,
    means for rotating patterns being transferred, said rotating means including
        address control means for addressing said groups of dots of a prestored pattern in a selected sequence, and
        means for changing the sequence of dots in a group of dots being transferred.

5. The system claimed in claim 4 further including, in said rotating means, means for indicating the orientation of the prestored patterns.

* * * * *